(12) United States Patent
Fujii et al.

(10) Patent No.: US 10,962,101 B2
(45) Date of Patent: Mar. 30, 2021

(54) DRIVING FORCE TRANSMISSION DEVICE

(71) Applicants: JATCO Ltd, Fuji (JP); NISSAN MOTOR CO., LTD., Yokohama (JP)

(72) Inventors: Shogo Fujii, Fuji (JP); Mitsuhiro Akiyama, Fuji (JP)

(73) Assignees: JATCO LTD, Fuji (JP); NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/644,913

(22) PCT Filed: Nov. 15, 2018

(86) PCT No.: PCT/JP2018/042213
§ 371 (c)(1),
(2) Date: Mar. 5, 2020

(87) PCT Pub. No.: WO2019/102921
PCT Pub. Date: May 31, 2019

(65) Prior Publication Data
US 2020/0224756 A1    Jul. 16, 2020

(30) Foreign Application Priority Data

Nov. 24, 2017    (JP) .............................. JP2017-225827

(51) Int. Cl.
*F16H 57/02*    (2012.01)
*F16J 15/02*    (2006.01)
(Continued)

(52) U.S. Cl.
CPC ......... *F16H 57/029* (2013.01); *F16H 57/031* (2013.01); *F16J 15/0818* (2013.01)

(58) Field of Classification Search
CPC .... F16H 57/029; F16H 57/031; F16J 15/0818
See application file for complete search history.

(56) References Cited

U.S. PATENT DOCUMENTS

| 8,864,140 | B2* | 10/2014 | Iwase ...................... F16J 15/14 |
| | | | 277/592 |
| 9,966,810 | B2* | 5/2018 | Johnson ................. H02K 3/522 |
| 10,648,545 | B2* | 5/2020 | Mizuuchi ............ F16H 25/2204 |

FOREIGN PATENT DOCUMENTS

| DE | 102006015663 A1 * | 8/2006 | ........... F16H 57/029 |
| JP | 2002-213583 A | 7/2002 | |

(Continued)

OTHER PUBLICATIONS

Machine translation of JP 2009-85395 A obtained on Jul. 27, 2020.*
(Continued)

*Primary Examiner* — Adam D Rogers
(74) *Attorney, Agent, or Firm* — Foley & Lardner LLP (57) ABSTRACT

A transmission case (10) includes a case (2) and a side cover (3). A rotation sensor (5) including a connector terminal part (52) is attached to the side cover (3). A seal member (FIPG) (4) is interposed between joining surfaces (22a, 32a) of the case (2) and the side cover (3). A notch portion (25) where the seal member (4) is accumulated is provided to an outer peripheral surface (22b) of the joining surface (22a) which is adjacent to the connector terminal part (52). Accordingly, the amount of the seal member (4) protruding outward from the outer peripheral surface (22b, 32b) of the flange portions (22, 32) is reduced, thus suppressing connection failure of a connector.

7 Claims, 5 Drawing Sheets (51) Int. Cl.
*F16H 57/029* (2012.01)
*F16H 57/031* (2012.01)
*F16J 15/08* (2006.01)

(56) References Cited

FOREIGN PATENT DOCUMENTS

| | | |
|---|---|---|
| JP | 2009-85395 A | 4/2009 |
| JP | 2016-64806 A | 4/2016 |

OTHER PUBLICATIONS

Machine translation of JP 2016-64806 A obtained on Jul. 27, 2020.*
International Search Report for PCT/JP2018/042213 dated Feb. 12, 2019 (with English translation).

* cited by examiner

DRIVING FORCE TRANSMISSION DEVICE

TECHNICAL FIELD

The present invention relates to a driving force transmission device.

BACKGROUND TECHNOLOGY

A transmission case of an automatic transmission (driving force transmission device) of a vehicle is assembled from members, such as a housing, a case and a side cover, by the screwing of bolts.

A patent document 1 discloses a transmission case in which a plurality of members, such as a housing, a case and a side cover, are joined to each other with a gasket or liquid packing sandwiched therebetween.

Figure 5:
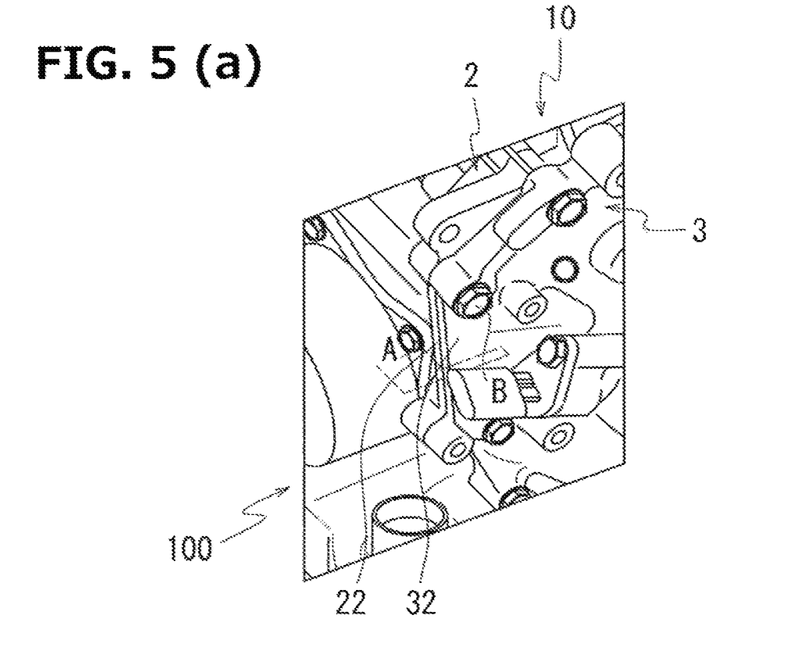
FIG. 5 is a drawing to explain the transmission case of the driving force transmission device to which a joining structure of a conventional example is applied.

FIG. 5 is an explanatory view of a transmission case 10 of an automatic transmission (driving force transmission device) 100 of a vehicle, according to a conventional example.

FIG. 5 (a) is an enlarged view of a main part of the transmission case 10. FIG. 5 (b) is a schematic diagram showing a sectional surface of the transmission case 10, in a surface A in FIG. 5 (a).

In addition, FIG. 5 (b) is a diagram when the sectional surface of the transmission case 10 is viewed from the lower side to the upper side of the paper surface.

As shown in FIG. 5 (a), the transmission case 10 is assembled in a state in which a flange portion 22 of the case 2 and a flange portion 32 of the side cover 3 have been superposed on each other.

As shown in FIG. 5 (b), in the transmission case 10, a joining structure 110 in which the superposed flange portions 22 and 32 are connected to each other with bolts B is adopted.

A seal member 4 is interposed between joining surfaces of the respective flange portions 22 and 32 of the case 2 and the side cover 3. This seal member 4 is provided to suppress the leaking of oil inside the transmission case 10 from the space between the superposed flange portions 22 and 32 to the outside.

Here, as the seal member 4, FIPG (Formed in Place Gasket) which is a kind of liquid gaskets, and which is also known as an on-site forming gasket and a casting gasket is used.

The FIPG is a liquid gasket, and it takes a few hours until the FIPG is cured.

Therefore, after applying the FIPG between the case 2 and the side cover 3, the transmission case 10 is left until the FIPG is cured, and then the fitting of other components (for example, electric components and the like) to the transmission case 10 is performed. Consequently, it becomes necessary to secure the place to leave the transmission case 10. In addition to this, processing time becomes long due to the leaving of the transmission case 10.

Therefore, to improve the shortening of the processing time, the fitting of other components is performed without waiting the curing of the FIPG, and after the fitting of the other components thereto, the transmission case 10 is left.

However, there is a case where a connector terminal part 52 of a rotation sensor 5 is located at a position adjacent to an area where the FIPG is applied (see FIG. 5 (b)). In this case, in the joining structure 110 of the conventional automatic transmission 100, when a connector which is not shown in the drawings is connected to the connector terminal part 52, the liquid FIPG before the curing which projects from the joining surfaces adheres to the connector, and consequently, connection failure may occur.

It has therefore been required to reduce the possibility of the connection failure of the connector.

PRIOR ART REFERENCE

Patent Document

Patent Document 1: Japanese Patent Application Publication 2002-213583

SUMMARY OF THE INVENTION

The present invention is configured to have a structure including:

a first case member;

a second case member including a connector terminal part; and a formed-in-place gasket provided between mating surfaces of the first case member and the second case member, wherein in an accumulating portion for the formed-in-place gasket is formed to at least an outer peripheral end portion of a mating surface which is adjacent to the connector terminal part.

According to the present invention, the possibility of the connection failure of the connector can be reduced.

MODE FOR IMPLEMENTING THE INVENTION

In the following, an embodiment according to the present invention will be explained by exemplifying a case where a driving force transmission device is an automatic transmission 1 for a vehicle.

Figure 1:
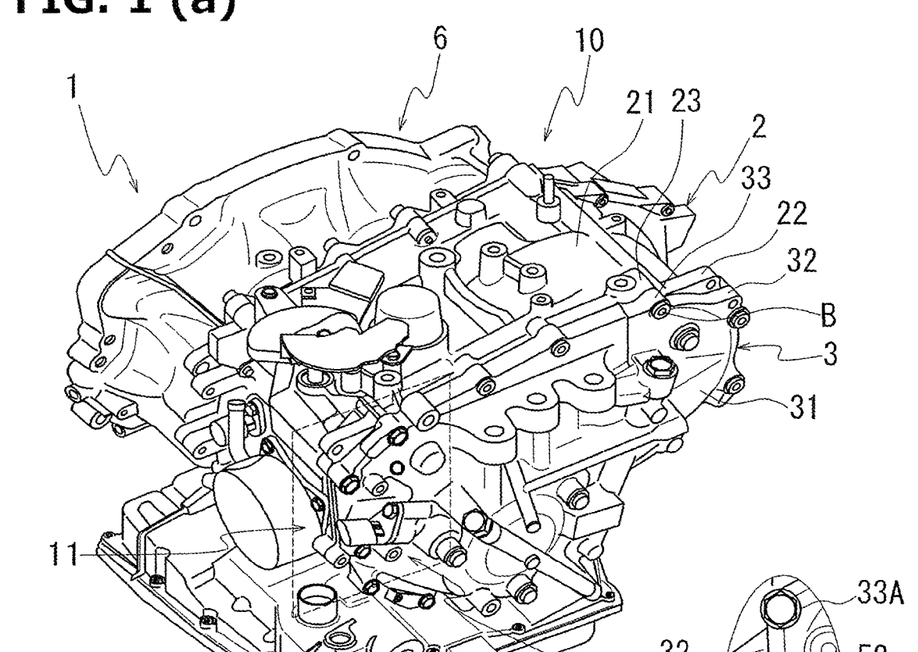
FIG. 1 is a drawing to explain a transmission case of a driving force transmission device to which a joining structure according to an embodiment is applied.

FIG. 1 is a drawing to explain a transmission case 10 of the automatic transmission 1.

FIG. 1 (a) is a perspective view of the transmission case 10.

FIG. 1 (b) is an enlarged view of a main part of the transmission case 10 when viewed from a side cover 3 side.

FIG. 1 (c) is a drawing when viewed from an arrow A-A in FIG. 1 (b).

Figure 2:
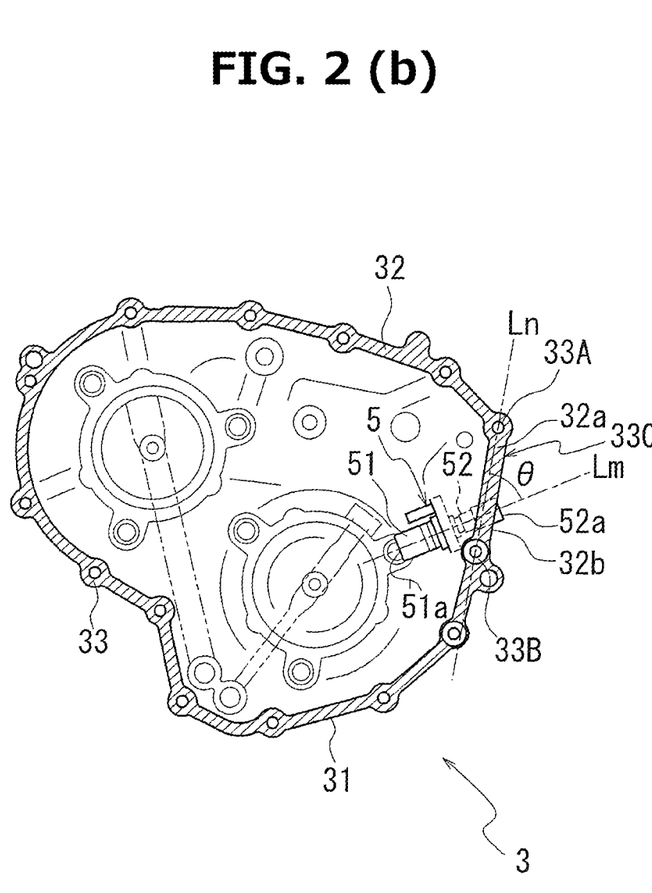
FIG. 2 is a drawing to explain the transmission case according to the embodiment.

FIG. 2 is a drawing to explain a case 2 and the side cover 3 of the transmission case 10.

FIG. 2 (a) is a plane view when viewing the case 2 from the side cover 3 side.

FIG. 2 (b) is a plane view when viewing the side cover 3 from a case 2 side.

Figure 3:
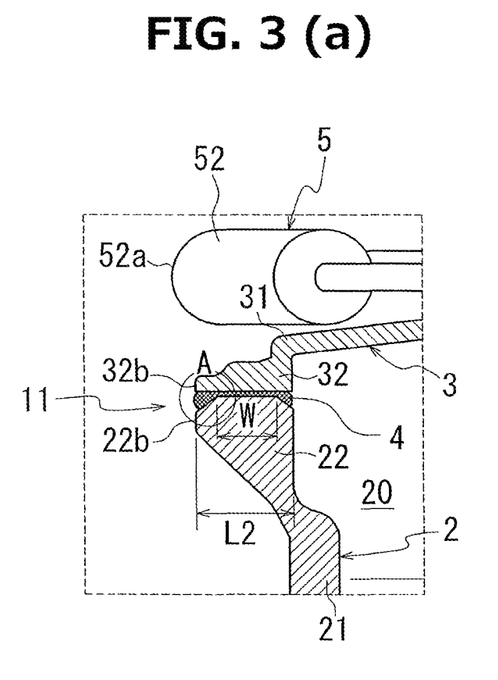
FIG. 3 is a drawing to explain the joining structure according to the embodiment.

FIG. 3 is a drawing to explain a joining structure 11 of the case 2 and the side cover 3.

FIG. 3 (a) is a schematic view of a C-C section in FIG. 1 (b).

FIG. 3 (b) is a schematic view of a D-D section in FIG. 1 (b).

FIG. 3 (c) is an enlarged view of an area A in FIG. 3 (a).

In addition, in FIG. 2 (b), a part of a rotation sensor is shown by a virtual line, in order to easily understanding the positional relation between a joining surface and the rotation sensor.

As shown in FIG. 1 (a), the transmission case 10 of the automatic transmission 1 is formed of the case 2, the side cover 3 and a converter cover 6 for accommodating a torque converter (not shown in the drawings).

As shown in FIG. 2 (a), the case 2 includes a pulley accommodation chamber 20 for accommodating a pair of pulleys (not shown in the drawings). The pair of the pulleys (not shown in the drawings) is accommodated inside a peripheral wall part 21 surrounding the pulley accommodation chamber 20.

The opening of the peripheral wall part 21 is sealed with the side cover 3 after installing the pulleys to the pulley accommodation chamber 20. The end portion on the side cover 3 side of the peripheral wall part 21 is provided with a flange portion 22 which is joined to a flange portion 32 of the side cover 3. The flange portion 22 is provided over the entire periphery in the circumferential direction of the peripheral wall part 21.

As shown in FIG. 3 (a), the flange portion 22 is formed so as to extend outward from the peripheral wall part 21, in the thickness direction of the peripheral wall part 21 (horizontal direction in the drawing).

The flange portion 32 of the side cover 3 is formed so as to extend outward from the peripheral wall part 31, in the thickness direction of the peripheral wall part 31 of the side cover 3 (horizontal direction in the drawing).

Here, in the following explanation, the distance from the inner periphery of the peripheral wall part 21 to the outer periphery of the flange portion 22 in the thickness direction of the peripheral wall part 21 is shown as the length of the flange portion 22. In addition, the distance from the inner periphery of the peripheral wall part 31 to the outer periphery of the flange portion 32 in the thickness direction of the peripheral wall part 31 is shown as the length of the flange portion 32.

The facing surface of the flange portion 22 and the facing surface of the flange portion 32 are joining surfaces 22a and 32a respectively (see hatched part in FIG. 2) which are joined to each other when the flange portion 22 and the flange portion 32 are superposed on each other. These joining surfaces 22a and 32a each are a flat surface orthogonal to the superposing direction of the flange portions 22 and 32 (vertical direction in FIG. 3 (a)).

In addition, the flange portion 22 is provided with a plurality of boss portions 23 through which respective bolts B are inserted, at predetermined intervals in the circumferential direction, and the flange portion 32 is provided with a plurality of boss portions 33 through which respective bolts B are inserted, at predetermined intervals in the circumferential direction (see FIG. 1).

The joining of the case 2 and the side cover 3 is carried out in the following steps.

(a) The seal member 4 is applied to at least one of the joining surfaces 22a and 32a of the flange portion 22 of the case 2 and the flange portion 32 of the side cover 3.

(b) The case 2 and the side cover 3 are arranged such that the flange portions 22 and 33 32 are superposed on each other.

(c) The case 2 and the side cover 3 are joined to each other by fastening the bolts B which have been inserted into the boss portions 23 and 33 of the flange portions 22 and 32.

Here, in the joining structure 11 of the case 2 and the side cover 3, the seal member 4 is interposed between the flange portions 22 and 32 superposed on each other. Accordingly, the oil inside the case 2 (pulley accommodation chamber 20) is suppressed from leaking between the joining surfaces 22a and 32a of the flange portions 22 and 32 superposed on each other to the outside.

In the embodiment, as the seal member 4 interposed between the flange portions 22 and 23, the above-mentioned liquid formed-in-place gasket (FIPG) is used.

The formed-in-place gasket is a kind of liquid-curing-type gaskets which are cured in a state in which a liquid gasket has adhered to both surfaces to be sealed.

As a liquid-curing-type gasket, in addition to the FIPG, CIPG (Cured In Place Gasket) which is also known as an assembly molded gasket can be cited.

In the CIPG, a liquid gasket is applied to one of facing surfaces, and after completing the curing of the gasket, the other of the facing surfaces is brought into contact with the cured gasket.

On the other hand, in the FIPG, the curing of a liquid gasket is carried out in a state of being sandwiched between both of the facing surfaces.

Therefore, when the FIPG is used, the problem that the liquid gasket protrudes from the joining surfaces might arise.

In other words, it can be said that the CIPG is a liquid-curing-type gasket adhering to only one of the facing surfaces, and the FIPG is a liquid-curing-type gasket adhering to both of the facing surfaces.

When the case 2 is joined to the side cover 3 with the bolts B, the seal member 4 interposed between the joining surfaces 22a and 32a of the flange portions 22 and 32 is pushed and expanded between the joining surfaces 22a and 32a of the flange portions 22 and 32 by a press contact force (fastening force of the bolts B) due to the joining.

As shown in FIG. 3 (a), at this time, the seal member 4 moves to the inner peripheral sides (right side in the drawing) and the outer peripheral sides (left side in the drawing) of the flange portions 22 and 32.

Then, by curing the seal member 4 after spreading it over the whole of the joining surfaces of the respective flange portions 22 and the flange portion 32, the space between the flange portion 22 of the case 2 and the flange portion 32 of the side cover 3 is sealed with the cured seal member 4.

[Rotation Sensor 5]

Here, as shown in FIG. 2 (b), the rotation sensor 5 is attached to the side cover 3.

The rotation sensor 5 is provided to detect the rotation of a pulley (not shown in the drawings). The rotation sensor 5 is provided so as to penetrate through the side cover 3. A sensor part 51 on one end side in the longitudinal direction of the rotation sensor 5 faces a pulley inside the pulley accommodation chamber 20. A connector terminal part 52 on the other end side thereof is located on the outside of the side cover 3.

As shown in FIG. 1 (b) and FIG. 2 (b), a distal end surface 52a of the connector terminal part 52 is located at a position in the vicinity of the flange portion 32.

When viewed in the superposing direction of the side cover 3, in the flange portion 32, the distal end surface 52a of the connector terminal part 52 is located in an area 330a between adjacent boss portions 33 and 33 in the circumferential direction (in the following, these adjacent boss portions 33 and 33 are shown as boss portions 33A and 33B).

As shown in FIG. 2 (b), in the area 330a between the boss portions 33A and 33B, an outer peripheral surface 32b of the flange portion 32 becomes an outer peripheral surface substantially parallel to a straight line Ln connecting the center of the boss portion 33A and the center of the boss portion 33B.

The rotation sensor 5 is attached to the side cover 3 in a state in which a center line Lm of the rotation sensor 5 has been inclined by a predetermined angle θ to the straight line Ln.

When viewed in the superposing direction of the side cover 3, the distal end surface 52a of the connector terminal part 52 is provided to extend across the outer peripheral surface 32b of the flange portion 32 from the inner side to the outer side thereof.

Here, in the joining structure 110 between the case 2 and the side cover 3 in the conventional one, when the flange portions 22 and 32 are joined to each other, the seal member 4 interposed between the flange portions 22 and 32 protrudes from the outer peripheral surfaces 22b and 32b of the flange portions 22 and 32 (see FIG. 5).

Consequently, when a connector which is not shown in the drawings is connected to the connector terminal part 52, the connector comes in contact with the seal member 4 protruding from the outer peripheral surfaces 22b and 32b of the flange portions 22 and 32, and the seal member 4 adheres to the connector.

Accordingly, if, in the connector, a part to which the seal member 4 has adhered is a connection part connected to the connector terminal part 52, connection failure occurs between the connector and the connector terminal part 52.

Therefore, in the joining structure 11 between the case 2 and the side cover 3 according to the present embodiment, a gap portion R1 is provided between the joining surfaces 22a and 32a of the respective flange portions 22 and 32 (see FIG. 3 (c)). Accordingly, the seal member 4 is caught to the gap portion R1, and the protruding of the seal member 4 from the outer peripheral surfaces 22b and 32b is suppressed.

[Gap Portion R1]

As shown in FIG. 1 (c), boss portions 23A and 23B of the plurality of the boss portions 23 circumferentially formed in the flange portion 22 respectively face the boss portions 33A and 33B of the flange portion 32. An area 230a between the boss portions 23A and 23B in the flange portion 22 faces the area 330a between the boss portions 33A and 33B in the flange portion 32.

As shown in FIG. 1 (c), a notch portion 25 formed by cutting out a part of the flange portion 22 is formed in the area 230a between the boss portions 23A and 23B of the flange portion 22 (see hatched part in the drawing).

As shown in FIG. 3 (c), the notch portion 25 is formed from a middle position P1 of the joining surface 22a in the longitudinal direction of the flange portion 22 toward the outer peripheral surface 22b of the flange portion 22.

A part of the flange portion 22 in which the notch portion 25 is formed becomes an inclined surface 22c inclined by a predetermined angle from the joining surface 22a.

In the present embodiment, from the middle position P1 of the joining surface 22a, the inclined surface 22c is inclined by 30 degrees in a direction away from the joining surface 32a of the side cover 3 (in the drawings, lower side) such that a distance to the joining surface 33a increases as a distance to the outer peripheral surface 22b decreases. In addition, the inclination angle of the inclined surface 22c may not be 30 degrees.

Consequently, when the joining surface 22a of the flange portion 22 and the joining surface 32a of the flange portion 32 are joined to each other, the gap portion R1 is formed between the inclined surface 22c of the flange portion 22 and the joining surface 32a of the flange portion 32. The gap portion R1 is formed such that an opening width H1 of the gap portion R1 in the superposing direction of the flange portions 22 and 32 (vertical direction in the drawing) increases as it goes to the outer peripheral surface 22b from the middle position P1.

Therefore, after the inside of the gap portion R1 is filled with the seal member 4, the seal member 4 interposed between the joining surfaces 22a and 32a of the respective flange portions 22 and 32 protrudes from the outer peripheral surfaces 22b and 32b of the flange portions 22 and 32.

That is, a part of the seal member 4 protrudes outward from the outer peripheral surfaces 22b and 32b of the flange portions 22 and 32 in the conventional one; however, this protruding seal member 4 is caught in the gap portion R1 (see FIG. 3 (a)).

Accordingly, at the time of the attachment of the connector, the possibility of the adhesion of the protruding seal member 4 to the connector can be reduced, and the occurrence of the connection failure of the connector can be suppressed.

It is preferable to properly adjust the viscosity of the seal member 4 (to be high), the angle of the inclined surface (to be small) and the discharge amount of the seal member 4 (to be small), to minimize the protruding of the seal member 4 due to the inclined surface 22c and the action of the gravity.

Here, as shown in FIG. 3, the seal member 4 pushed and expanded between the joining surfaces 22a and 32a of the flange portions 22 and 32 comes over in contact with the inclined surface 22c of the flange portion 22, the joining surface 22a and the joining surface 32a.

The sealing property of the seal member 4 is determined by a width W of the mating surfaces (see FIG. 3) of the joining surfaces 22a and 32a which are flat surfaces orthogonal to the joining direction. In a case where the length of the flange portion 22 in the area 230a in which the notch portion 25 is formed is equal to a length L1 that is the same length as the flange portion 22 in another area 230b (see FIG. 2 (a)) in which the notch portion 25 is not formed, the effective width W of the mating surfaces becomes short by the notch portion 25, and the sealing property deteriorates.

In the present embodiment, in order to secure the sealing property of the seal member 4, in the flange portions 22 and 32, a length L2 in the area in which the gap portion R1 is provided is longer than the length L1 (L2>L1) in the other area in which the gap portion R1 is not provided.

In the flange portions 22 and 32, the outer peripheral surfaces 22b and 32b in the area in which the gap portion R1 is provided is therefore protrude to the outside of the transmission case 10 more than the outer peripheral surfaces 22b and 32b in the other area by securing the mating surface width W (see FIG. 3 (a) and FIG. 3 (b)).

In one preferable example, the mating surface width W in the area 230a having the notch portion 25 is substantially equal to the mating surface width W in the other arear 230b with no notch portion 25.

Here, if the length of each of the flange portions 22 and 32 is set to the length L2 over the entire circumference to suppress the deterioration of the sealing property, the material to be used increases, as a result of which cost increases.

Therefore, in the present embodiment, in the flange portions 22 and 32, the length of each of the flange portions 22 and 32 only in the area near the connector terminal part 52 (areas 230a and 330a) is set to be longer (width is increased).

Consequently, the mating surface width W of the joining surfaces 22a and 32a is also secured, and thereby the increase of the cost can be minimized while suppressing the deterioration of the sealing property of the seal member 4 (see FIG. 3).

As mentioned above, in the present embodiment, (1) the driving force transmission device includes:

the case 2 (first case member);

the side cover 3 (second case member) attached with the rotation sensor 5 including the connector terminal part 52; and the seal member 4 (formed-in-place gasket) provided between the joining surfaces (mating surfaces) 22a and 32a of the case 2 and the side cover 3, wherein in the outer peripheral surface 22b side (outer peripheral end portion) of the joining surface 22a which is adjacent to the connector terminal part 52, the notch portion 25 is provided to the case 2.

According to the above configuration, by providing the notch portion 25 to the outer peripheral surface 22b of the joining surface 22a, an accumulation shape (accumulating portion, gap portion R1) for the seal member 4 (formed-in-place gasket) is formed. With this, the amount of the seal member 4 protruding outward from the outer peripheral surfaces 22b and 32b of the flange portions 22 and 32 can be suppressed. Since the smaller the protruding amount of the seal member 4 is, the more the possibility of the adhesion of the seal member 4 to the connector at the time of the attachment of the connector can be reduced, the occurrence of the connection failure of the connector can be suppressed.

(2) The notch portion 24 is locally provided to the outer peripheral surface 22b of the joining surface 22a which is adjacent to the connector terminal part 52.

When the notch portion 25 is provided, the width W of the mating surfaces is secured by forming the flange portions 22 and 32 so as to be thick, because if a notch is provided without changing a flange shape (thickness), the width W of the mating surfaces that is an effective sealing width becomes short, and then the sealing property deteriorates.

In this case, if the length of each of the flange portions 22 and 32 is set to be long (thick) over the entire circumference, the material to be used increases, as a result of which cost increases. Therefore, in this way, by locally providing the notch portion 25, an increase in the cost can be minimized.

(3) The joining surface 22a includes the area 230a (first mating surface area including a notch) in which the notch portion 25 is formed and the area 230b (second mating surface area including no notch) in which the notch portion 25 is not formed, wherein the arear 230a in which the notch portion 25 is formed is locally provided so as to be adjacent to the connector terminal portion 52, and wherein, in the direction from the inside toward the outside of the peripheral wall part 21, the extension length L2 of the flange portion 22 in the area 230a in which the notch portion 25 is formed is longer than the extension length L1 of the flange portion 22 in the area 230b in which the notch portion 25 is not formed.

When the notch portion 25 is provided without changing the length of the flange portion 22, the mating surface width W that is an effective sealing width becomes short, and the sealing property deteriorates.

Here, if the length of each of the flange portions 22 and 32 is set to be long (to be thick) over the entire circumference, since the material to be used increases, the cost rises.

However, according to the above configuration, even if the notch portion 25 is provided, a predetermined mating surface width W can be secured. Therefore an increase in the cost can be minimized while suppressing the deterioration of the sealing property.

(4) The case 2 and the side cover 3 respectively include boss portions 23A and 23B (two bolt holes) and the boss portions 33A and 33B (two bolt holes) each having the shortest distance from the connector terminal part 52, and the notch portion 25 is locally provided between the boss portions 23A and 23B.

According to the above configuration, the mating surface width W of the joining surfaces 22a and 32a is also secured, and the sealing property by the sealing member 4 does not deteriorate.

The present invention is also applied as a manufacturing method for the automatic transmission 1 (driving force transmission device).

That is, (5) the present invention is a method for manufacturing the automatic transmission 1 which includes: the case 2; the side cover 3 attached with the rotation sensor 5 having the connector terminal part 52; and the seal member 4 (formed-in-place gasket) provided between the joining surface 22a of the case 2 and the joining surface 32a of the side cover 3, wherein, in the outer peripheral surface 22b of the joining surface 22a which is adjacent to the connector part 52, the notch portion 25 is provided to the case 2, the method including:

curing the liquid seal member 4 after the connector is connected to the connector terminal part 52 in a state in which the seal member 4 has been disposed between the joining surfaces 22a and 32a.

As shown in FIG. 1 (a), the converter cover 6 (third case member) is attached to the case 2 on the opposite side of the side cover 3 sandwiching the case 2.

According to the above configuration, it is especially effective in a case where the converter cover 6 is provided and the connector is attached to the connector terminal part 52 from the converter cover 6 side. That is, in a case where the connector needs to be attached such that the wiring is performed from the converter cover 6 side due to the line restriction in a factory, this invention is especially effective. The present invention is, of course, effective when the connector is attached from the first case member side.

[Variation]

Figure 4:
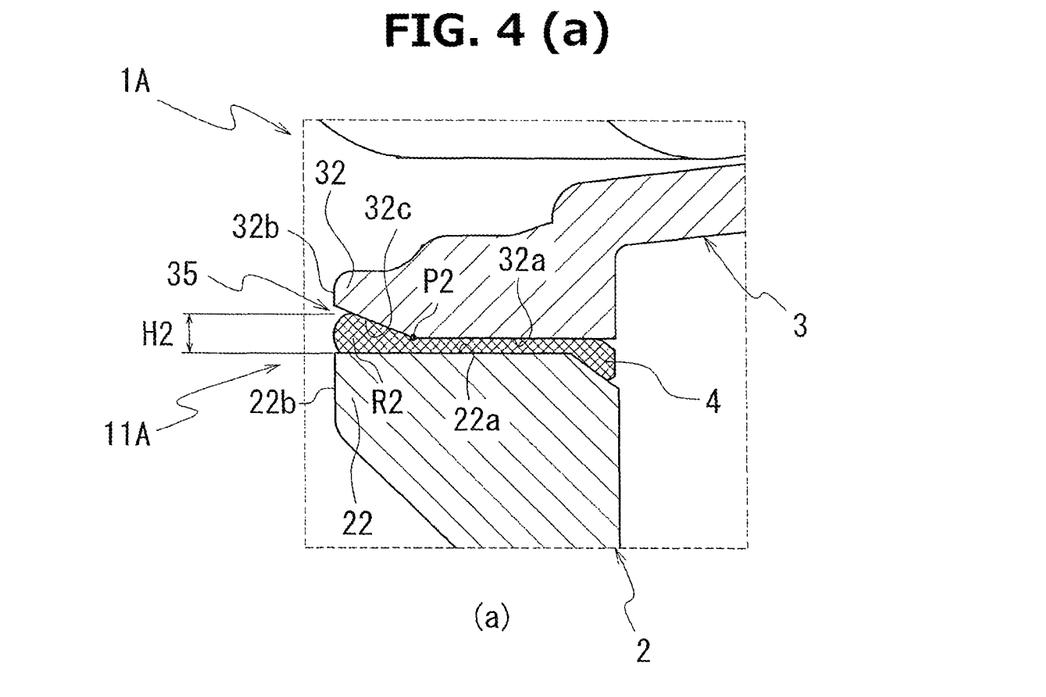
FIG. 4 is a drawing to explain the transmission case of the driving force transmission device to which a joining structure according to a variation is applied.

FIG. 4 is a drawing to explain a transmission case of a driving force transmission device to which a joining structure according to a variation is applied.

FIG. 4 (a) is a drawing to explain a transmission case of a driving force transmission device to which a joining structure according to a first variation is applied.

FIG. 4 (b) is a drawing to explain a transmission case of a driving force transmission device to which a joining structure according to a second variation is applied.

In the embodiment mentioned above, although the automatic transmission 1 to which the joining structure 11 in which the notch portion 25 is formed to the flange portion 22 has been shown as an example, the present invention is not limited to this embodiment.

For example, as shown in FIG. 4 (a), an automatic transmission 1A to which a joining structure 11A having a structure in which a notch portion 35 is formed to the flange portion 32 may be available.

In addition, as shown in FIG. 4 (b), an automatic transmission 1B to which a joining structure 11B having a structure in which the notch portions 25 and 35 are formed to the flange portion 22 and the flange portion 32 respectively may be available.

In addition, in the following explanation, only a difference from the automatic transmission 1 to which the joining structure 11 according to the embodiment is applied will be explained.

[First Variation]

A notch portion 35 is provided in the area 330a between the boss portions 33A and 33B of the flange portion 32, in a joining structure 11A according to a variation.

As shown in FIG. 4 (a), the joining surface 22a of the flange portion 22 becomes a flat surface orthogonal to the superposing direction of the flange portions 22 and 33 (in the drawing, vertical direction).

The notch portion 35 is formed from a middle position P2 of the joining surface 32a in the longitudinal direction of the flange portion 32 toward the outer peripheral surface 32b of the flange portion 32.

A part of the flange portion 32 in which the notch portion 35 is formed becomes an inclined surface 32c inclined by a predetermined angle from the joining surface 32a.

This inclined surface 32c is inclined in the direction away from the joining surface 22a of the case 2 such that a distance to the joining surface 22a increases as a distance to the outer peripheral surface 32b decreases.

Consequently, when the joining surface 22a of the flange portion 22 and the joining surface 32a of the flange portion 32 are joined to each other, a gap portion R2 is formed between the joining surface 22a of the flange portion 22 and the inclined surface 32c of the flange portion 32. This gap portion R2 has a shape such that an opening width H2 in the superposing direction of the flange portions 22 and 32 (vertical direction in the drawing) increases as it goes to the outer peripheral surface 32b from the middle position P2.

Therefore, a part of the seal member 4 protrudes outward from the outer peripheral surfaces 22b and 32b of the flange portions 22 and 32 in the conventional one; however, this protruding seal member 4 is stored inside the gap portion R2 (see FIG. 4 (a)).

Consequently, at the time of the attachment of the connector, the possibility of the adhesion of the protruding seal member 4 to the connector can be reduced, and thereby the occurrence of the connection failure of the connector can be suppressed.

[Second Variation]

The notch portion 35 is provided in the area 330a between the boss portions 33A and 33B of the flange portion 32, in a joining structure 11B according to a variation.

As shown in FIG. 4 (b), the notch portions 25 and 35 are formed to the joining surface 22a of the flange portion 22 and the joining surface 32a of the flange portion 32 respectively.

when the joining surface 22a of the flange portion 22 and the joining surface 32a of the flange portion 32 are joined to each other, a gap portion R3 is formed between the inclined surface 22c of the flange portion 22 and the inclined surface 32c of the flange portion 32. This gap portion R3 has a shape such that an opening width H3 in the superposing direction of the flange portions 22 and 32 (vertical direction in the drawing) increases as it goes to the outer peripheral surfaces 22b and 32b from the middle positions P1 and P2.

Therefore, a part of the seal member 4 protrudes outward from the outer peripheral surfaces 22b and 32b of the flange portions 22 and 32 in the conventional one; however, this protruding seal member 4 is stored inside the gap portion R3 (see FIG. 4(b)).

Consequently, at the time of the attachment of the connector, the possibility of the adhesion of the protruding seal member 4 to the connector can be reduced, and thereby the occurrence of the connection failure of the connector can be suppressed.

In the embodiment mentioned above, a case where a driving force transmission device is an automatic transmission for a vehicle is shown as an example. However, the driving force transmission device of the present invention is not limited to the automatic transmission for a vehicle.

The present invention can be also applied to a device having a structure in which in a gear train formed of a plurality of gears, at least one of the gears scrapes up oil inside an accommodation case of the gear train. As the device, a deceleration device which decelerates input rotation and outputs it is cited as an example.

As the above, although the embodiment of the present invention has been explained, the present invention is not limited to a mode shown in the embodiment. The present invention can be properly modified within the technical idea of the invention.

The invention claimed is:

1. A driving force transmission device comprising:
   a first case member;
   a second case member including a connector terminal part; and
   a formed-in-place gasket provided between mating surfaces of the first case member and the second case member,
   wherein an accumulating portion for the formed-in-place gasket is formed at one of outer peripheral end portions of the mating surfaces of the first and second case members without extending over an entirety of the outer peripheral end portions, and
   wherein, in at least one of the outer peripheral end portions, the accumulating portion is provided at a position adjacent to the connector terminal part.

2. The driving force transmission device according to claim 1, wherein the accumulating portion is formed by providing a notch portion to at least one of the first case member and the second case member.

3. The driving force transmission device according to claim 1, wherein the accumulating portion is provided along an inclined surface of the first case member.

4. The driving force transmission device according to claim 1, wherein the accumulating portion is provided along an inclined surface of the second case member, and at least a portion of the gasket opposite the accumulating portion is provided along an inclined surface of the first case member.

5. The driving force transmission device according to claim 1, wherein the accumulating portion is provided along a first inclined surface of the first case member and a first inclined surface of the second case member, the first inclined surface of the first case member and the first inclined surface of the second case member being opposed to each other, and a portion of the gasket opposite the accumulating portion is provided along a second inclined surface of the first case member.

6. A driving force transmission device comprising:
   a first case member;

a second case member including a connector terminal part; and a formed-in-place gasket provided between mating surfaces of the first case member and the second case member, wherein an accumulating portion for the formed-in-place gasket is formed at one of outer peripheral end portions of the mating surfaces of the first and second case members without extending over an entirety of the outer peripheral end portions, wherein each of the first case member and the second case member includes bolt holes located adjacent the connector terminal part, and wherein, in one of the outer peripheral end portions, the accumulating portion is provided at a position adjacent to the connector terminal part.

7. The driving force transmission device according to claim 6, wherein the accumulating portion is formed by providing a notch portion to at least one of the first case member and the second case member.

\* \* \* \* \*